(12) United States Patent
Rune et al.

(10) Patent No.: US 10,064,221 B2
(45) Date of Patent: Aug. 28, 2018

(54) DETERMINING A TRANSITION OF A TERMINAL BETWEEN ITS IDLE STATE AND ITS CONNECTED STATE

(75) Inventors: Johan Rune, Lidingö (SE); Konstantinos Dimou, San Francisco, CA (US); György Miklós, Pilisborosjenö (HU)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 0 days.

(21) Appl. No.: 14/384,064

(22) PCT Filed: Mar. 14, 2012

(86) PCT No.: PCT/EP2012/054484
§ 371 (c)(1),
(2), (4) Date: Nov. 12, 2014

(87) PCT Pub. No.: WO2013/135287
PCT Pub. Date: Sep. 19, 2013

(65) Prior Publication Data
US 2015/0118993 A1    Apr. 30, 2015

(51) Int. Cl.
*H04W 76/02* (2009.01)
*H04W 12/08* (2009.01)
*H04W 76/04* (2009.01)

(52) U.S. Cl.
CPC ........... *H04W 76/02* (2013.01); *H04W 12/08* (2013.01); *H04W 76/046* (2013.01); *Y02B 60/50* (2013.01)

(58) Field of Classification Search
CPC ........... H04B 7/00; H04W 68/00; H04L 67/32
See application file for complete search history.

(56) References Cited

U.S. PATENT DOCUMENTS

2002/0122403 A1*  9/2002  Hashem ............... H04W 40/02
                                                    370/342
2003/0224772 A1* 12/2003  Patzer ................. H04M 3/2263
                                                    455/419

(Continued)

OTHER PUBLICATIONS

3GPP, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11)", 3GPP TS 36.300 V11.0.0, Dec. 2011, 1-194.

(Continued)

*Primary Examiner* — Frantz Bataille
(74) *Attorney, Agent, or Firm* — Patent Portfolio Builders, PLLC

(57) ABSTRACT

A method of determining a transition of a terminal (110) between its idle state and its connected state is described. The connected state of the terminal (110) is associated with the terminal (110) being connected to a node (108) of a radio access network (104) of a communication network (100). The method comprises at least one of at least partly setting up, prior to a connection setup procedure for setting up a connection between the terminal (110) and the node (108) of the radio access network (104), a security configuration to be used between the terminal (110) and the node (108) of the radio access network (104) for communication, and at least partly setting up, prior to the connection setup procedure, a bearer configuration to be used between the terminal (110) and the node (108) of the radio access network (104) for communication. Thus, an efficient usage of network resources and/or energy resources of a terminal in association with a transition of a terminal between its idle state and its connected state may be enabled.

15 Claims, 8 Drawing Sheets

(56) References Cited

U.S. PATENT DOCUMENTS

| | | | | |
|---|---|---|---|---|
| 2004/0247023 | A1* | 12/2004 | Sasai | H04L 63/0492 375/220 |
| 2008/0311933 | A1* | 12/2008 | Lim | H04W 68/02 455/458 |
| 2009/0093280 | A1* | 4/2009 | Kitazoe | H04W 76/046 455/574 |
| 2009/0258663 | A1* | 10/2009 | Xu | H04W 68/00 455/515 |

OTHER PUBLICATIONS

3GPP, "3rd Generation Partnership Project; Technical Specification Group Radio Access Network; Evolved Universal Terrestrial Radio Access (E-UTRA); User Equipment (UE) procedures in idle mode (Release 10)", 3GPP TS 36.304 V10.2.0, Jun. 2011, 1-33.

3GPP, "3rd Generation Partnership Project; Technical Specification Group Radio Access Network; Evolved Universal Terrestrial Radio Access (E-UTRA); User Equipment (UE) procedures in idle mode (Release 10)", 3G pp TS36.304 V10.4.0, Dec. 2011, 1-34.

3GPP, "3rd Generation Partnership Project; Technical Specification Group Radio Access Network; Evolved Universal Terrestrial Radio Access Network (E-UTRAN); X2 application protocol (X2AP) (Release 10)", 3GPP TS 36.423 V10.2.0, Jun. 2011, 1-130.

3GPP, "3rd Generation Partnership Project; Technical Specification Group Services and System Aspects; Service requirements for Machine-Type Communications (MTC); Stage 1 (Release 11)", 3GPP TS 22.368 V11.3.0, Sep. 2011, 1-24.

Unknown, Author, "Efficient small data transmission", Vodafone, IPWireless, SA WG2 Meeting #86, S2-113826, Naantali, Finland, Jul. 11-15, 2011, 1-4.

Unknown, Author, "Handling of UE capability information in SAE/L TE", Ericsson, 3GPP TSG-RAN WG2 #57-bis, R2-071328, St. Julian, Malta, Mar. 26-30, 2007, 1-4.

Unknown, Author, "Network Attach Procedure", Ericsson, TSG-RAN WG3 Meeting #53bis, R3-061490, Seoul, Korea, Oct. 10-13, 2006, 1-4.

* cited by examiner

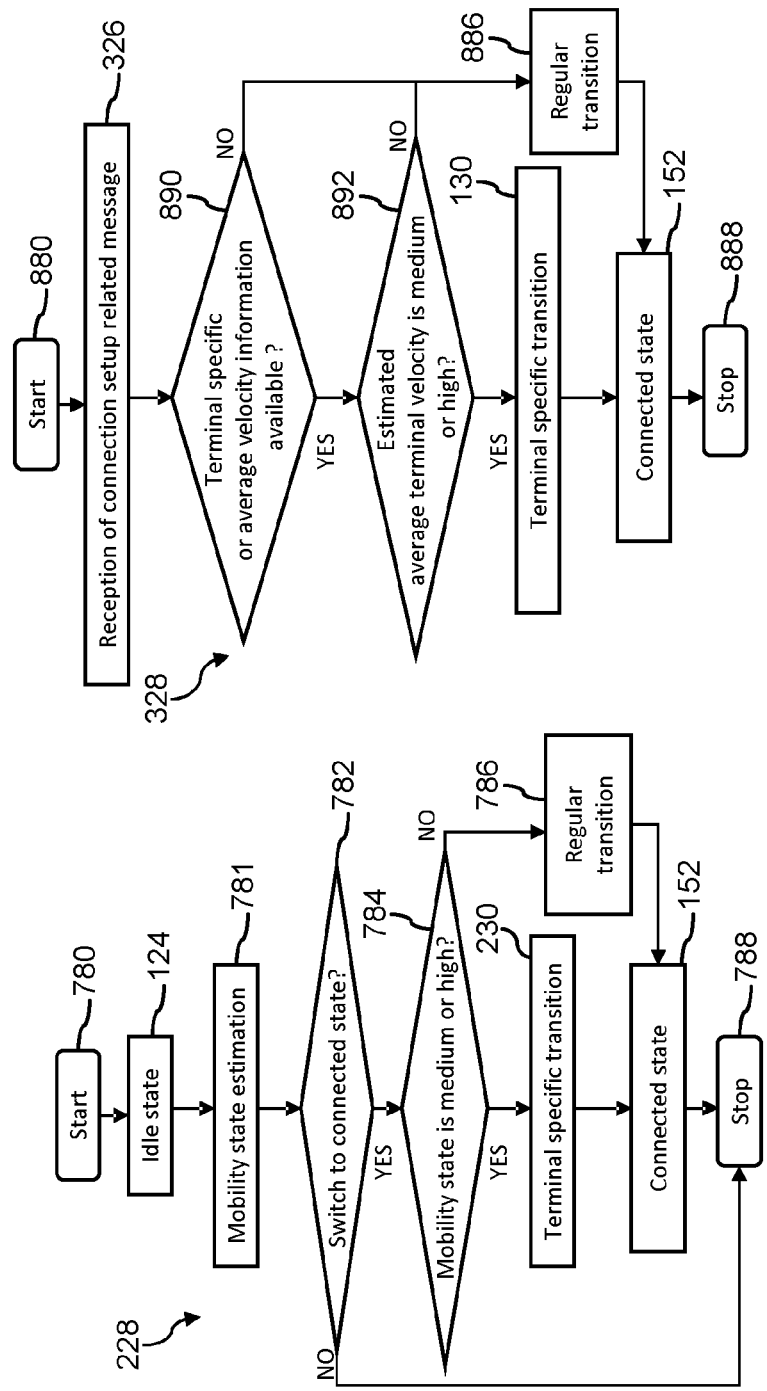

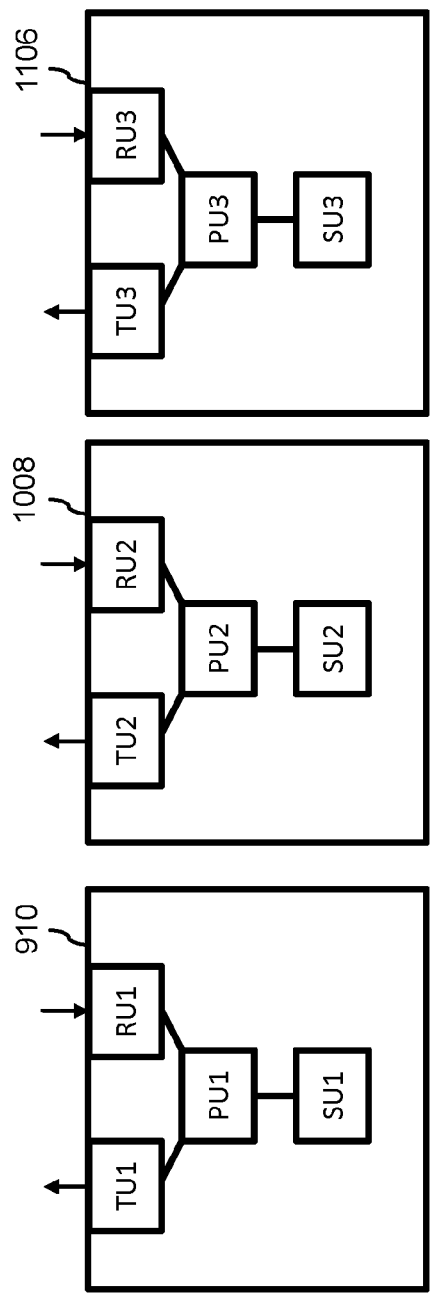

DETERMINING A TRANSITION OF A TERMINAL BETWEEN ITS IDLE STATE AND ITS CONNECTED STATE

TECHNICAL FIELD

The invention relates to a method, a terminal, and a node of a radio access network for managing a transition of a terminal between its idle state and its connected state, and a computer program.

BACKGROUND

A cellular communication architecture may comprise machine type communication (MTC) terminals which may be characterized by an infrequent and small data traffic. This particular kind of data transmission of a MTC terminal may often come along with limited energy resources of the MTC terminal. For example, such a MTC terminal may be configured as a sensor or actuator configured for measuring a temperature, and being powered by a battery. The sensor or actuator may periodically send status update reports, for example once per week, to an application server located in the communication network or outside of the communication network.

Usually, the MTC terminal only remains in its connected state for a short time, and accordingly switches from its connected state into its idle state, in order to save the energy resources of the MTC terminal. Therefore, each data transmission of the MTC terminal may be accompanied by a transition of the MTC terminal from its idle state into its connected state.

Therefore, current communication network deployments may show a signaling overhead resulting from frequent transitions of a MTC terminal from its idle state into its connected state. Further, although being energy-deprived, an energy consumption of a MTC terminal may be high owing to the performed transitions and the time when being in the connected state. Yet further, communication network resources may be inefficiently used owing to the signaling exchange associated with the transition of a MTC terminal.

It is known that extended Discontinuous Reception (DRX) cycles can be applied to MTC terminals such that the MTC terminal may stay during the prolonged DRX time in its standby mode while being still connected to the radio access network. Therefore, energy resources of the MTC terminal may be saved, and, further, transitions of the MTC terminal from its idle state into its connected state may be omitted.

However, a MTC terminal may roam from one cell to another cell of the radio access network, and may thus show a high mobility. Therefore, such a MTC terminal is not suitable for using DRX extended cycles in that measurement reports executed by the MTC terminal in association with the handover may not be feasible.

SUMMARY

It is an object of the present invention to provide measures for an efficient usage of network resources and/or energy resources of a terminal in association with a transition of a terminal between its idle state and its connected state.

The object defined above is solved by a method of, a terminal for, and a node of a radio access network for determining a transition of a terminal between its idle state and its connected state, and a computer program according to the independent claims.

According to an exemplary aspect of the invention, a method of determining a transition of a terminal between its idle state and its connected state is provided. The connected state of the terminal is associated with the terminal being connected to a node of a radio access network of a communication network. The method comprises at least one of at least partly setting up, prior to a connection setup procedure for setting up a connection between the terminal and the node, a security configuration to be used between the terminal and the node for communication, and at least partly setting up, prior to the connection setup procedure, a bearer configuration to be used between the terminal and the node for communication.

According to another exemplary aspect of the invention, a terminal for determining a transition of the terminal between its idle state and its connected state is provided. The connected state of the terminal is associated with the terminal being connected to a node of a radio access network of a communication network. The terminal comprises at least one of a setting up unit configured to at least partly set up, prior to a connection setup procedure for setting up a connection between the terminal and the node, a security configuration to be used between the terminal and the node for communication, and another setting up unit configured to at least partly set up, prior to the connection setup procedure, a bearer configuration to be used between the terminal and the node for communication.

According to another exemplary aspect of the invention, a node of a radio access network for determining a transition of a terminal between its idle state and its connected state is provided. The connected state of the terminal is associated with the terminal being connected to the node of the radio access network of a communication network. The node comprises at least one of a setting up unit configured to at least partly set up, prior to a connection setup procedure for setting up a connection between the terminal and the node, a security configuration to be used between the terminal and the node for communication, and another setting up unit configured to at least partly set up, prior to the connection setup procedure, a bearer configuration to be used between the terminal and the node for communication.

According to another exemplary aspect of the invention, a control node of a communication network associated with a radio access network for determining a transition of a terminal between its idle state and its connected state is provided. The connected state of the terminal is associated with the terminal being connected to a node of the radio access network of the communication network. The control node comprises at least one of a setting up unit configured to at least partly set up, prior to a connection setup procedure for setting up a connection between the terminal and the node, a security configuration to be used between the terminal and the node for communication, and another setting up unit configured to at least partly set up, prior to the connection setup procedure, a bearer configuration to be used between the terminal and the node for communication.

According to another exemplary aspect of the invention, a computer program is provided. The computer program, when being executed by a processor, is configured to carry out or control a method of determining a transition of a terminal between its idle state and its connected state as described above.

Further embodiments of the invention are defined in the dependent claims.

BRIEF DESCRIPTION OF THE DRAWINGS

Embodiment of the invention will be described in more detail hereinafter with reference to examples, but to which the scope of the invention is not limited.

FIG. 7 is a flow diagram illustrating a step of the method in FIG. 1 of determining whether to perform a terminal specific transition of a terminal from its idle state into its connected state.

FIG. 8 is a flow diagram illustrating a step of the method of FIG. 3 of determining whether to perform a terminal specific transition of a terminal from its idle state into its connected state.

FIG. 9 is a block diagram illustrating a terminal for determining a transition of the terminal between its idle state and its connected state according to an exemplary embodiment of the invention.

FIG. 10 is a block diagram illustrating a node of a radio access network for determining a transition of a terminal between its idle state and its connected state according to an exemplary embodiment of the invention.

FIG. 11 is a block diagram illustrating a control node for determining a transition of a terminal between its idle state and its connected state according to an exemplary embodiment of the invention.

DETAILED DESCRIPTION

Figure 1:
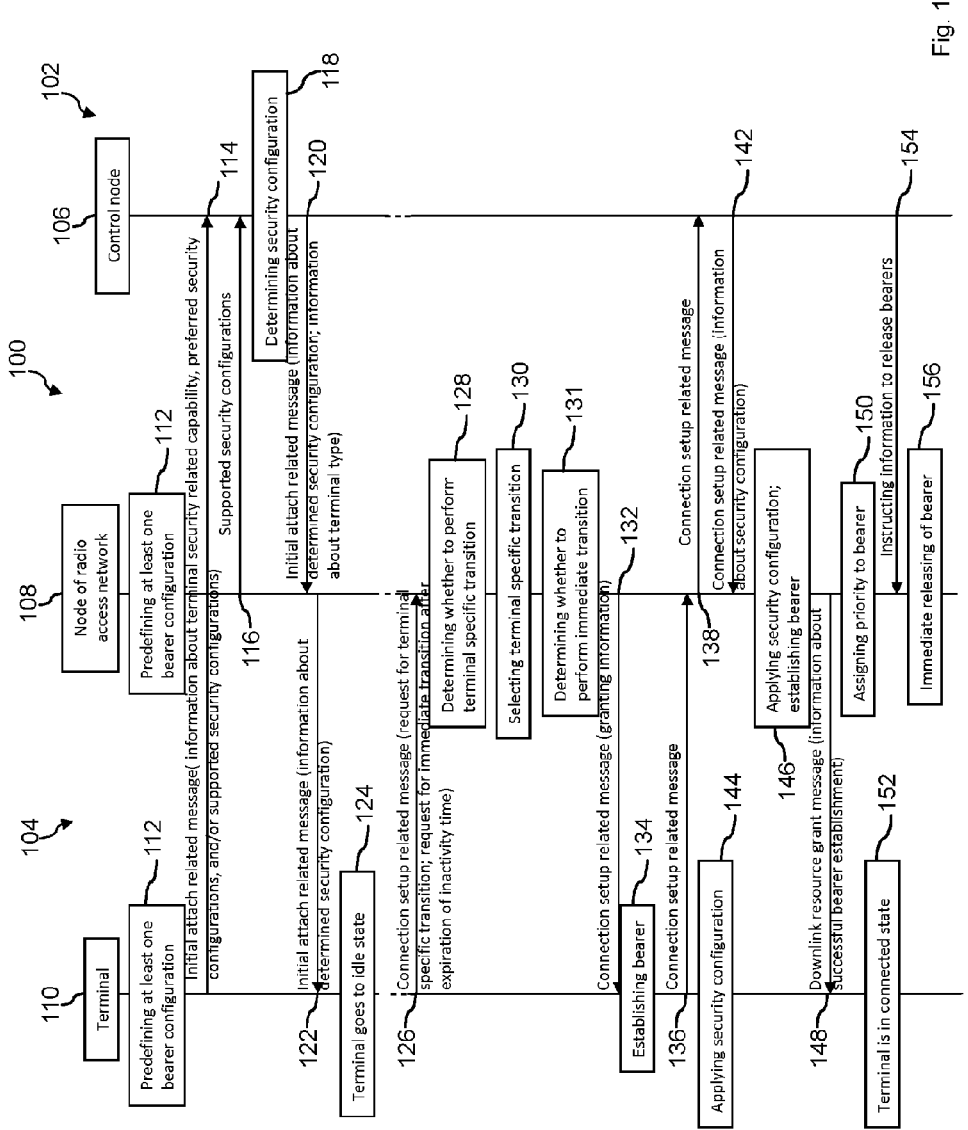
FIGS. 1 to 3 are flow diagrams illustrating a method of determining a transition of a terminal between its idle state and its connected state according to exemplary embodiments of the invention.

The illustration in the drawing is schematic. In different drawings, similar or identical elements or steps are provided with the same reference signs or with reference signs which are different from one another within the first digit.

In the following, the method, the terminal, the node, the control node and the computer program according to the exemplary aspects of the invention will be explained in more detail.

Within the context of the present application, the term "determining a transition of a terminal" may particularly denote a partial or complete setup of the transition for the terminal and optionally an execution of the transition for the terminal.

The term "idle state" of a terminal may particularly denote a state of the terminal, in which the terminal may be switched on, but does not have any established connections, particularly RRC connections, with a radio access network.

The term "connected state" of a terminal may particularly denote a state of the terminal in which the terminal may be switched on and a connection, particularly a RRC connection, with the radio access network may have been established.

The term "security configuration" to be used between a terminal and a radio access network may particularly denote a mutual configuration of the terminal and the radio access network regarding security issues for an information transmission between these entities. In particular, a security configuration may relate to an encryption of information to be transmitted.

The term "bearer configuration" to be used between a terminal and a radio access network may particularly denote parameters for channel resources used to transport, preferably packet-switched (PS), information.

According to the exemplary aspects of the invention, a determination of a transition of a terminal between its idle state and its connected state, particularly from its idle state into its connected state, may comprise a transition setup for a bearer configuration and/or a security configuration to be used between the terminal and the node which may be executed at least partly at an early stage of the actual transition, for example prior to RRC related signaling between the terminal and the node for setting up the security configuration and/or the bearer configuration, or even prior to the actual transition. In particular, in a case of a packet-switched radio access network, RRC type messages used for exchanging a security configuration, for example SecurityModeCommand and SecurityModeComplete messages, and/or RRC type message used for exchanging a bearer configuration, for example RRCConnectionReconfiguration and RRCConnectionReconfigurationComplete messages, may be omitted in comparison to a conventional transition of a terminal from its idle state into its connected state. Therefore, a streamlined transition procedure comprising reduced signaling message exchange between the terminal and the node may be accomplished.

Therefore, a signaling overhead associated with a transition procedure of a terminal between its idle state and its connected state may be significantly reduced. Further, particularly in a case of energy resources limited terminals, an overall energy consumption of the terminal may be reduced, since an energy consumption associated with a signaling exchange during the transition may be reduced. Further, since a signaling sequence of the transition of the terminal from its idle into its connected state may be reduced by particularly four messages across the radio interface, signaling resources of the communication network associated with the transition of the terminal can be efficiently utilized and processing resources of the involved entities may be kept low.

Further, the measures as to the signaling reduced procedure associated with the transition of the terminal may be particularly applicable to mobile terminals, and may thus represent a complement mechanism to save energy resources of such a mobile terminal compared to a usage of the extended DRX cycles for stationary or not mobile terminals and/or slowly or infrequently moving terminals.

Next, further exemplary embodiments of the method will be explained. However, these embodiments also apply to the terminal, the node, the control node, and the computer program.

The step of at least partly setting up the security configuration may comprise determining, by a control node of the communication network associated with the radio access network, the security configuration during an initial procedure between the terminal and the control node, and the method may further comprise informing the terminal about the determined security configuration. For example, the initial procedure may correspond to an Initial Attach procedure for registering a terminal in the control node, or may correspond to a Tracking Area Update (TAU) procedure in a Long Term Evolution (LTE) radio access network or a Routing Area Update (RAU) procedure in a Global System for Mobile Communications (GSM) Enhanced Data Rates for GSM Evolution (EDGE) Radio Access Network (GERAN) or a Universal Mobile Telecommunications System (UMTS) Terrestrial Radio Access Network (UTRAN). The latter procedures may be used by a terminal for attaching to a new radio access network. The step of informing the terminal may be part of the step of at least partly setting up the security information prior to the connection setup procedure between the terminal and the node or may be executed during the connection setup procedure between the terminal and the node. Therefore, processing capacities in the radio access network may be kept low by transferring the determination step into the control node of particularly a core network of the communication network.

The node may be informed about the determined security configuration by the control node during a connection setup procedure for setting up a connection between the node and the control node and/or by the terminal during the connection setup procedure for setting up the connection between the terminal and the node. In the first option, the step of informing the node by the control node may be performed subsequent to the connection setup procedure between the terminal and the radio access network, and may be included or embedded, for example, in a S1AP Initial Context Setup Request message sent between the control node and the node when establishing the context in the node. In the second option, the information about the determined security configuration may be embedded in a RRC connection establishment related message, for example a RRCConnectionRequest message or a RRCConnectionSetupComplete message. In particular, the step of informing the node by the terminal may be executed subsequent to the step of informing the terminal by the control node, and the terminal may have already performed one or more transitions between its connected state and the idle state. Therefore, despite the determination of the security configuration by the control node, all entities involved in the connection setup procedure between the terminal and the communication network may be properly informed about the necessary security configuration. In both options, conventional connection setup related messages may be used for informing the node, thereby facilitating the method by reusing conventional signaling.

The step of at least partly setting up the security configuration may comprise receiving, by the control node, information about at least one of a capability of the terminal related to the security configuration, a preferred security configuration of the terminal, a supported security configuration of the terminal, and a supported security configuration of the node, wherein the step of determining the security configuration may be executed based on the received information. The term "preferred security configuration of a network entity" may particularly denote a security configuration preferred by the network entity. The term "supported security configuration of a network entity" may particularly denote a security configuration supported by the network entity. The terminal related information and the node related information may be received together in one message, for example in an Attach Request message in which the terminal may include the terminal related information and which may be forwarded by the node after including the node related information. Additionally or alternatively, the terminal related information and the node related information may be received by the control node in separate messages. In particular, the control node may accept the security configuration preferred by the terminal. Alternatively, in particular in a case of more preferred or supported security configurations, the control node may select a suitable security configuration. This measure may enable the determined security configuration to be usable by the terminal and the node, thereby avoiding incompatibilities of the security configuration with the involved entities.

In particular, the terminal related information about the security configuration may be received by the control node from a subscriber server, particularly a Home Subscriber Server (HSS), of the communication network by means of, for example, downloading subscription data of the terminal. Therefore the terminal related information may be available in the control node independently of signaling exchange with the terminal.

In particular, the terminal related information about the security configuration may be configured as an index or indices using Operation & Maintenance (O & M) mechanisms. In particular, a mapping of these indices to the security configuration by the control node may be standardized or indicated in system information in the radio access network, particularly system broadcast information. To this end, the terminal may be configured using device management mechanisms, for example an Open Mobile Alliance (OMA) Device Management (DM), an over-the-air mechanism, an User Subscriber Identity Module (USIM) configuration, system broadcast information and/or RRC related or Non Access Stratum (NAS) related signaling.

In particular, in a case of a software upgrade of the node related to the supported security configurations, the node may inform the control node about its modified supported security configurations particularly using a S1AP ENB Configuration Update message.

In particular, the step of at least partly setting up the security configuration may comprise storing, by the control node, information about a context of the terminal and transferring the context between a control node and a further control node particularly in a case of a control node relocation, i.e. in a case of a handover of the terminal between different radio access networks together with a change of the serving control node.

The step of at least partly setting up the security configuration may comprise predefining at least one security configuration, i.e. one or more security configurations, in the communication network, wherein the predefined at least one security configuration may be supported by the node and by further nodes, particularly all nodes, of the radio access network, and the method may further comprise selecting, by the terminal and the node, the predefined at least one security configuration. Therefore, particularly in addition or alternatively to the determination of the security configuration by the control node, a redundant possibility for an easy and efficient setup of the security configuration may be enabled. The at least one security configuration may be configured as a default security configuration, for example a standardized security configuration to be applicable to multiple communication scenarios in the communication network.

The step of selecting, by the node, the predefined at least one security configuration may comprise selecting the predefined at least one security configuration in response to being informed by the terminal about the selected predefined at least one security configuration during the connection setup procedure and/or in response to an absence of being informed by the control node about the, particularly determined, security configuration to be used. In particular, the terminal is not informed by the control node about any determined predefined at least one security configuration and may therefore inform the node about its selected security configuration. In particular, the terminal initiated informing may be executed during the RRC procedure and respective information may be included in a RRC connection establishment message, particularly in a RRCConnectionRequest message or a RRCConnectionSetupComplete message. Therefore, a trigger for the selection of the predefined at least one security configuration by the node may be provided, enabling the selection of the kind of the security configuration to be set up.

The method may further comprise skipping, by the node, to apply an algorithm or more algorithms of the security configuration for communication based on information about a characteristic of the terminal. This measure may be applied in a case in which the security configuration may be determined by the control node and/or the predefined at least one security configuration may be selected. Therefore, an efficient information or data transmission between the terminal and the radio access network may be enabled, since a signaling load of the data transmission during the transition of the terminal and/or in the connected state may be significantly reduced and processing capacity of the involved entities when performing a data processing using the algorithm of the security configuration may be eliminated.

In particular, the method may comprise, determining by the node, whether to skip to apply the algorithm of the security configuration to be used for communication based on the information about the characteristic of the terminal, and the step of skipping may be executed based on a result of the step of determining, particularly if the step of determining may be in the affirmative.

The step of skipping to apply the algorithm of the security configuration may comprise applying a null algorithm or more null algorithms defined in the node for the skipped algorithm of the security configuration. The term "null algorithm" may particularly denote an algorithm having no impact on an information or data transmission, for example a transmission of payload or signaling data. This additional measure may result in a similar effect compared to simply skipping to apply the algorithm of the security configuration. However, conventionally established security configuration related mechanisms in the terminal and the node may be employed for the data processing, thereby facilitating the implementation of the step of skipping in an already existing communication architecture.

In particular, the method may comprise determining, by the node, whether to apply the null algorithm for the skipped algorithm of the security configuration to be used for communication based on the information about the characteristic of the terminal, and the step of applying the null algorithm may be executed based on a result of the step of determining, particularly if the step of determining may be in the affirmative.

The characteristic of the terminal may comprise a capability of the terminal to communicate free of a security configuration, wherein the information may be received from the terminal. In particular, the terminal may indicate to the node its capability to communicate using the null algorithm instead of the algorithm of the security configuration. Therefore, the terminal may instruct the node to skip applying the algorithm of the security configuration and/or to apply the null algorithm using its knowledge about its own capability such that a determination of the node whether to skip the algorithm of the security configuration and/or whether to apply the null algorithm may be accurately executed.

The characteristic of the terminal may comprise a type of the terminal, wherein the information may be received from the terminal and/or from a control node of the communication network associated with the radio access network. The term "type of the terminal" may comprise a category or a class of terminal, for example a terminal category defined by a particular data rate. In a case in which the information about the characteristic of the terminal may be received from the control node, the control node may re-transmit the information at reception of the information from the subscriber server. The information about the characteristic of the terminal may also be embedded in RRC related messages from the terminal to the node and/or in a S1 Initial Context Request message sent between the control node and the node. Therefore the transition of the terminal between its idle state and its connected state may be executed without increased signaling overhead by using conventionally defined messages.

In particular, the one or more types of terminals for which the application of the algorithm of the security configuration may be skipped and/or for which the null algorithm should be applied may be indicated or defined in the system information. The node may compare the received information about the type of the terminal with the system information, and may determine whether to skip to apply the algorithm of the security configuration and/or whether to apply the null algorithm based on a result of the step of comparing. In particular, the node may determine to skip to apply the algorithm of the security configuration and/or to apply the null algorithm if the comparison may result in the type of the terminal coinciding with one of the types of the terminals indicated in the system information.

The step of at least partly setting up the bearer configuration may comprise determining, by a control node of the communication network associated with the radio access network, the bearer configuration during an initial procedure between the terminal and the control node, and the method may further comprise informing, by the control node, the terminal about the determined bearer configuration. As detailed above, the initial procedure may correspond to the Initial Attach, TAU or RAU procedure. The step of informing the terminal may be part of the step of at least partly setting up the bearer configuration prior to the connection setup between the terminal and the node. In particular, the step of informing the terminal about the determined security configuration and the step of informing the terminal about the determined bearer configuration may be simultaneously executed, for example using the same message or messages.

The node may be informed about the determined bearer configuration by the control node during a connection setup procedure for setting up a connection between the node and the control node and/or by the terminal during the connection setup procedure for setting up a connection between the terminal and the node. Therefore, the node may be informed during the transition of the terminal, and respective conventionally used RRC connection establishment messages or S1AP messages both detailed in association with the informing of the node about the security configuration may be employed.

The step of at least partly setting up the bearer configuration may comprise predefining at least one bearer configuration, i.e. one or more bearer configurations, in the communication network, wherein the at least one bearer configuration may be supported by the node and by further nodes, particularly all nodes, of the radio access network, and the method may further comprise establishing, by the terminal and the node, a bearer associated with the predefined at least one bearer configuration. In particular, the node may be informed or instructed to establish the bearer associated with the predefined at least one bearer configuration particularly by the terminal or the usage of the predefined at least one bearer configuration may be indicated in system information in the radio access network.

In particular, additionally or alternatively to the above-mentioned measures of the step of at least partly setting up the bearer configuration, the method may further comprise the step of, particularly dynamically, selecting a bearer configuration by the node, and informing the terminal about the bearer configuration to be selected. The step of informing the terminal may be efficiently executed by using a RRC connection setup related message, for example a RRCConnectionSetup message.

In particular, one or more technical effects and advantages detailed in association with the set up of the security configuration may similarly apply to the above described measures for setting up the bearer configuration in the communication network.

In particular, the above detailed measures for setting up the bearer configuration and accordingly establishing a bearer associated with the bearer configuration may result in a modified S1AP Initial Context Setup Request message comprising fewer bearer parameters associated with the bearer configuration and an absence of a subsequent RRC-ConnectionReconfigurationRequest message comprising relevant bearer parameters associated with the bearer configuration. Therefore, the selected and established bearer configuration does not represent a terminal specific bearer configuration used during the transition of the terminal. In case of necessity, the terminal specific bearer configuration may be established later during the connected state of the terminal using a RRCConnectionReconfiguration and RRCConnectionReconfigurationComplete messages exchange.

The radio access network may comprise a further node, wherein a connection setup procedure between the terminal and the further node of the radio access network may have been initiated and particularly has not been terminated, and the method may further comprise determining, by a control node of the communication network associated with the radio access network, another security configuration to be used between the terminal and the further node of the radio access network, and informing, by the control node, the terminal/or and the further node of the radio access network about the determined another security configuration. In particular, the node may be informed via the S1AP Initial Context Setup Request message by the control node. In particular, the step of informing the terminal may be executed subsequent to a reception of the S1AP Initial UE message by the control node particularly in the S1AP Initial Context Setup Request message and a further downlink message sent from the further node to the terminal. Further, in a case in which the S1AP Initial UE message may comprise a NAS Service Request, the control node may inform the terminal about the newly determined security configuration using new parameters in a NAS Authentication Request message, a NAS SecurityModeCommand message, a NAS GUTI Reallocation Request message or a new type of NAS message which is not defined in the transition procedure until now. In particular, in a case in which the S1AP Initial UE message may comprise a NAS TAU Request, the control node may inform the terminal about the newly determined security configuration in the NAS TAU Accept message. Alternatively to the latter described TAU case, the step of informing the terminal may make use of the NAS Authentication Request message, the NAS SecurityModeCommand message, the NAS GUTI Reallocation Request message or a newly defined NAS type message. Further, in the TAU case, the step of informing the node about the security configuration may be omitted in that the node may already be aware of the determined security configuration. Alternatively, the control node may not instantly inform the node about the newly determined security configuration, and a regular TAU procedure may be performed by the terminal. The control node may wait until a subsequent service request procedure of the terminal before updating the security configuration, and may first verify whether the terminal may still communicate via a further node not supporting the current security configuration. Altogether, incompatibility of the further node with the security configuration initially dedicated to be used for communication may be avoided, which incompatibilities may result from a cell re-selection of a mobile terminal during the performed transition of the terminal from its idle state into its connected state.

In particular, the radio access network may comprise a further node, wherein the terminal may comprise a connected state being associated with the terminal being connected to the further node, and the method may further comprise determining, by the control node, another security configuration, and informing the further node and/or the terminal about the determined another security configuration to be used for communication between the terminal and the further node. In particular, in a case in which the terminal may perform a X2 based handover, the control node may inform the terminal about the another security configuration between two mobility related messages, for example the S1AP Path Switch Request message and the S1AP Path Switch Request Acknowledgement message, and may inform the further node in a mobility related message, for example the S1AP Path Switch Request Acknowledgement message. Other suitable NAS based messages for informing the terminal may comprise the NAS GUTI Reallocation Request message or a newly defined NAS type message. In particular, in a case in which the terminal may have executed a S1 based handover, the control node may inform the node about the another security configuration in a S1AP Handover Request message, and may inform the terminal between the S1AP Handover Request message and the S1AP Handover Command message. Other suitable NAS based messages for informing the terminal may be identical to the S2 based handover scenario. Therefore, a similar procedure for setting up the another security configuration between the terminal and the further node compared to the initially used security configuration may be employed, thereby meeting incompatibilities of the further node with the initially determined security configuration and meanwhile facilitating mechanisms of the method.

In particular, in both the above detailed cell-reselection and handover case of the terminal, the terminal may inform the control node about its preferred and/or supported security configuration or configurations such that the determination of the control node may be based on this information. Here, in a first option, the control node may request this information from the terminal in a case in which the terminal may have already informed the control node about its preferred and/or supported security configuration for the initial determination of the security configuration to be used between the node and the terminal. Depending on the kind of NAS procedure initiating the communication between the terminal and the control node via the further node, an additional, newly defined NAS message may have to be sent from the control node to the terminal to inform the terminal about the determined another security configuration and to conclude an establishment of the another security configuration in the terminal. Alternatively or additionally, the terminal may always indicate, in a second option, its preferred or supported security configurations in a NAS type message which may be first sent to the control node via the further node.

The step of determining the another security configuration may comprise selecting, by the control node, the another security configuration from a set of security configurations supported by the node and further nodes, particularly all nodes, in the radio access network. In particular, the set of security configurations may comprise at least one security configuration, i.e. one or more security configurations, supported by the nodes in the radio access network, and may particularly comprise the predefined at least one security configuration. This set of security configurations may be a subset of a set of security configurations available in and/or supported by a respective node of the radio access network. Further, the control node and further control nodes, particularly all control nodes, may be configured with this set of security configurations. Thus, another very simple possibility for avoiding incompatibilities of the node with the initial determined security configuration may be provided for a mobility induced terminal re-selection of a cell of the radio access network during the performed transition of the terminal.

The radio access network may comprise a further node, wherein a connection setup procedure between the terminal and the further node of the radio access network may have been initiated and particularly has not been terminated, and the method may further comprise selecting, by the further node, another security configuration, and informing the terminal about the selected another security configuration particularly via a RRC SecurityModeCommand message. In particular, the further node may select the predefined at least one security configuration or may dynamically select one security configuration. In the latter case, it may be assumed that the terminal may also support the selected security configuration. Thus, the initial security configuration may be temporarily overwritten in the terminal. The terminal may then use this newly selected another security configuration while remaining in the coverage area of the further node, for example the current cell or any other cell belonging to the further node. However, the terminal may apply the initial security configuration when entering a coverage area of a yet further node, for example another cell. Here, the yet further node may represent the node with which the terminal may have initially communicated for the setup of the security configuration or a node distinct from the node and the further node. Therefore terminal mobility induced incompatibilities of the further node with the security configuration may be avoided.

In particular, in all above described embodiments, the another security configuration may be distinct or identical to the security configuration initially dedicated to be used for communication between the terminal and the node.

The transition may be configured as a terminal specific transition, wherein the node may further support a terminal independent transition of the terminal from its connected state into its idle state, and the method further may comprise determining whether to perform the terminal specific transition for the terminal, and selecting to perform the terminal specific transition for the terminal based on a result of the step of determining. In particular, the terminal specific transition may be selected if the determination may be in the affirmative. Alternatively, the terminal specific transition will not be selected, if the determination is not in the affirmative. The terminal independent transition may be configured as a regular or conventional transition of the terminal between its idle state and its connected state, and may be associated with or defined by a transition procedure according to Third Generation Party Project (3GPP) Technical Specification (TS) 36.304 v10.2.0. Therefore, a selective application of the above described terminal specific transition of the terminal between its idle state and its connected state may be enabled such that mechanisms associated with the terminal specific transition may be applied to a particular terminal or a particular type of terminal, i.e. a class or category of terminals, while other terminals may be handled using regular procedures.

The step of determining whether to perform the terminal specific transition may be executed by the terminal based on an estimated value of an actual velocity of the terminal in the radio access network. In particular, the terminal may perform the estimation of the value of its actual velocity when the terminal is, for example, in its idle state, for example in accordance with 3GPP TS 36.304 v10.4.0. The estimation of the value of the actual velocity may be based on the history of the terminal, i.e. using one or more measurements performed by the terminal. Alternatively, the value of the actual velocity of the terminal in the radio access network may be estimated using external velocity estimation equipment, for example a Geographically Positioning Satellite (GPS) technique or other satellite based positioning systems. In such a case, the terminal may receive measurement results and may estimate the value of the average velocity or may receive the estimated value of the actual velocity of the terminal, and may base the step of determining whether to perform the terminal specific transition on the received estimated value. For example, a velocity threshold may be employed for the step of determining whether to perform the transition or not. Therefore, the application of the terminal specific transition to a particular terminal or a class of terminals may be highly accurate.

In particular, the value of the actual velocity of the terminal may be associated with a mobility state of the terminal for example using predefined velocity thresholds associated with the mobility states. For example, such mobility states may be categorized in "low", "medium" or "high". In particular, one mobility state may be calculated based on the history of the time dependent velocity of the terminal or multiple mobility states may be determined in accordance with multiple values of the timed dependent velocity, and an average mobility state of the terminal may be calculated based on the latter.

The step of determining whether to perform the terminal specific transition may be executed by the node based on at least one of an estimated value of an average velocity associated with the terminal in the radio access network and information about a type of the terminal. Here, the term "average velocity associated with the terminal" may particularly denote an average velocity of one particular terminal, i.e. a terminal specific average velocity, or an average velocity ascertained for multiple terminals in the radio access network and being assumed to be representative for the velocity of one terminal. In particular, the node may associate the information about a type of the terminal with the mobility state of the terminal particularly using mechanisms described above, thereby basing the step of determining on mobility information about the terminal. Therefore, the application of the terminal specific transition to particular kinds of terminals may be highly accurate.

In particular, the node may estimate the average velocity of the terminal using Doppler shift measurements and/or directional measurements of the terminal velocity for example based on multiple antennas when the terminal may be in the connected state.

Additionally or alternatively, the node may estimate the average velocity associated with the terminal by evaluating terminal velocities of terminals, particularly all terminals, in the coverage area, for example in one or more cells, or may evaluate the average velocity or velocity range of those terminals. Here, the terminals are in the connected state, and the information about historical movements through previous cells may be available at the radio access network, since the UE history Information Element (IE) may be exchanged by the X2 interface during the transmission of the X2AP handover request message particularly in accordance with 3GPP TS 36.423. This information element may contain information of up to sixteen previously visited cells and a time spent per cell such that the average velocity may be easily determined.

In particular, the step of determining, by the node or the terminal, may be based on information about a traffic intensity or a traffic volume generated by or expected from a terminal. The traffic intensity and/or traffic volume may be measured by the node itself, and/or an intermediate gateway in the communication network, for example a Serving Gateway S-GW and/or a Packet Data Network (PDN) Gateway (GW). These traffic related measurement results may stem from, for example, real-time or very recently performed measurements and/or long-term historical traffic related measurement data. Additionally or alternatively, an expected traffic volume or/or traffic intensity derived from subscription data, terminal capabilities or a terminal type, and/or an energy resources limitation, for example a battery limitation of a battery of the terminal, and/or Deep Packet Inspection (DPI) statistics aiming to analyze which applications a terminal may commonly use may be used. In a case in which subscription data may be part of the basis for the determination, the step of determining may be performed by the control node, which may subsequently inform the node and/or the terminal. In the case of the energy resources limitation being part of the basis for the determination, this information may be obtained using signaling information about a terminal type, a terminal capability, subscription data and/or signaling information about a current energy status of the terminal, for example a battery status of the terminal.

Therefore, the determination step may help to identify terminals comprising the following characteristics for the application of the terminal specific transition: A small traffic volume, low traffic intensity and/or a traffic defined by small, infrequent data transactions and/or limited or scare energy resources. For example, the terminal specific transition may be applied to MTC terminals, and the terminal independent transition may be applied to other terminal distinct from MTC terminals.

The step of determining, by the node and/or the control node, may be also based on a current traffic load. The node may, for example, use a current signaling load, for example in the control plane and being related to RRC type communication, in a cell as input data when performing the determination. If the signaling load may be determined to be high, for example above a certain threshold, the determination may be in the affirmative.

The step of determining, by the node, the terminal and/or the control node, may be also based on information about a terminal mobility, a time of day, a day of week, a month, a location of the terminal, a policy defined for the radio access network or the communication network. The latter may relate to, for example, a special treatment of roaming terminals in general or roaming terminals being in a certain location of the radio access network or the communication network.

Additionally or alternatively, the node or the control node may receive an indication for a type of the terminal particularly from the terminal or from the subscriber server, and the step of determining, by the node, may be based on the received indication. Such an indication may indicate "stationary terminal", "low mobility terminal" or "high mobility terminal". Here, the control node may, upon reception of the indication, forward this information to the node for the step of determining using a S1AP type message.

In particular, the terminal may request from the node to perform the terminal specific transition by indicating the request in a connection setup related message, for example a RRRConnectionRequest message, by using a dedicated random access preamble associated with the terminal specific transition and selected from a set of random access preambles, or by indicating, to the node, an expected duration of a connection, for example a short connection duration.

In particular, in order to enable the node to perform the step of determining and/or to apply the terminal specific transition for the terminal, the terminal may have already been registered in the control node, and the control node may have informed the node about a mapping between an identifier of the terminal, for example a System Architecture Evolution (SAE)-Temporary Mobile Subscriber Identity, and a type of transition to be performed. When requesting the transition, the terminal may provide its identifier to the node which in turn may use the mapping for the determination.

Alternatively or additionally to the step of determining whether to perform the terminal specific transition, the type of transition to be performed for the terminal may be predefined in the communication network, for example as offline agreement between the terminal and the control node and indicated in subscription information. Further, the terminal and the control node may negotiate the type of transition to be performed for the terminal during the initial procedure between the terminal and the control node. In both options, the control node may inform the node about whether to perform the terminal specific transition for the terminal or not.

The method may further comprise exclusively informing, by the node, the terminal about an unsuccessful establishment of the bearer associated with the bearer configuration in the node. Therefore, in a case of a successful establishment of the bearer associated with the bearer configuration in the node, the terminal is not informed about the latter. For example, a negative acknowledgement (NACK) about the unsuccessful establishment of the bearer in the node may be sent from the node in a RRCConnectionReject, a RRCConnectionRelease or a RRCConnectionReconfigurationRequest message to the terminal. Alternatively, a NAS message may be sent from the node to the terminal in a downlink information transfer (DLInformationTransfer) which may be particularly sent upon reception of a NACK from the control node in a Service Reject NAS message.

The method may further comprise informing, by the node, the terminal about a successful establishment of the bearer associated with the bearer configuration in the node and about an unsuccessful establishment of the bearer associated with the bearer configuration in the node. In particular, the positive or negative feedback may be sent in an uplink (UL) and/or downlink (DL) scheduling assignments in the form of implicit indications of success or failure. For example, in a case in which downlink data may be pending in the node, for example if the transition was triggered by a paging, a downlink scheduling assignment may serve as positive feedback. In a case in which no downlink data may be pending in the node, the positive feedback may be configured as an unsolicited uplink grant.

In particular, the method may further comprise always omitting to inform the terminal about an unsuccessful establishment of the bearer associated with the bearer configuration in the node and about a successful establishment of the bearer associated with the bearer configuration in the node. In such a case, the terminal may blindly assume that the bearer establishment was successful. In a case in which the bearer establishment in the node has been unsuccessful, the terminal may recognize the latter once attempting any further action in association with the bearer assumed to be established.

In particular, the latter mentioned steps of informing the terminal in association with the bearer establishment in the node may particularly serve to replace an implicit confirmation of the successful outcome of the bearer establishment in the node including the NAS Service Request message, since the SecurityModeCommand message usually used for the feedback of the node to the terminal about the bearer establishment may not be sent in the inventive method.

The method may further comprise requesting, by the terminal, during the connection setup procedure between the terminal and the node an immediate transition of the terminal from its connected state into its idle state after an expiration of a predefined inactivity time of the terminal when being in its connected state, and immediately releasing, by the node, the established bearer, particularly all established bearers for the terminal, after the expiration of the predefined inactivity time of the terminal based on the received request. The request may be included in the RRCConnectionRequest message or the RRCConnectionSetupComplete message. Accordingly, the terminal specific transition between the idle state of the terminal and the connected state of the terminal may be beneficially combined with a mechanism to quickly release the connection between the terminal and the communication network, in order to set the terminal back from its connected state into its idle state after a short period of inactivity of the terminal. For example, the terminal may be switched back into its idle state after a small initial transaction of user plane data. Thus, a consumption of energy resources of the terminal may be reduced. Further, it may be ensured that current communication needs of the terminal may be quickly served such that the terminal may be transferred back to its idle state as quickly as possible.

In particular, the node may determine whether to perform the immediate transition based on the received request, wherein the step of releasing the established bearer may be executed based on a result of the step of determining, particularly if the step of determining may be in the affirmative. For example, a usage of the terminal specific transition may itself trigger in the node to apply the immediate transition mechanism. In this case, the request may be implicit, and may be configured as information about the application of the terminal specific transition. Additionally or alternatively, the step of determining may be executed based on a reception of information about a capability or a type of the terminal. Here, the request may be also implicitly configured. The information may be received, for example, from the terminal or the control node. To this end, the control node may have received subscription data comprising the information about the terminal type from a subscriber server. As detailed above, the node may compare the received information about the terminal type with the system information in which one or more types of terminals may be defined for which the immediate transition should be applied. Additionally or alternatively, the terminal may send an explicit request for the immediate transition to the node.

In particular, the step of requesting may comprise sending an indicator in the RRCConnectionRequest message or a RRCConnectionSetupComplete message. For example, the indicator may comprise a binary flag or several possible values indicating different levels of timeout values or value ranges associated with the inactivity time. This indicator may impact a utilization of the terminal inactivity timeout by the node. A request comprising such an indicator may represent an explicit request for the immediate transition. The indicator can be also configured as a simple information element such as "short-lived connection desired", "short connection timeout desired" or "small data amounts expected". The first mentioned options of the information element may represent an explicit request for the immediate transition, and the latter mentioned option of the information element may represent an implicitly configured request for the immediate transition.

In particular, the method may further comprise assigning, by the node, priority to an established bearer associated with the bearer configuration used for communication based on a result of the step of determining, particularly if the step of determining may be in the affirmative. In particular, the step of assigning may be automatically executed subsequent to an affirmative determination to perform the immediate transition of the terminal. Therefore the node may serve the terminal for which the immediate transition may have been granted prior to other terminals being served by the node, thereby speeding up the immediate transition of the terminal back into its idle state.

In particular, the node may inform the control node about the expiration of the inactivity time and/or may request the release of the established bearer from the control node, and may release the bearer upon receiving, from the control node, a respective instruction to release the established bearer. For example, the control node may instruct or order the node to release a S1 connection as well as the RRC connection including all resources allocated to the terminal. Next, further exemplary embodiments of the terminal will be explained. However, these embodiments also apply to the method, the node, the control node, and the computer program.

The terminal may be configured as a MTC terminal or device particularly in accordance with 3GPP TS 22.368. Therefore the above described method may beneficially enable an improved power management of such a terminal.

In particular, the terminal may be configured to, particularly automatically, execute one or more steps of the above described method.

Next, further exemplary embodiments of the node will be explained. However, these embodiments also apply to the method, the terminal, the control node, and the computer program.

In particular, the node may be configured to, particularly automatically, execute one or more steps of the above described method.

In particular, the node may be configured as an eNodeB of LTE radio access network, a Radio Network Controller (RNC) or a NodeB of an UTRAN, or a Base Station Controller (BSC) or a Base Station (BS) of a GERAN. Therefore, the described method may be applicable to Evolved Packet System (EPS) and LTE as well as Wideband Code Division Multiple Access (WCDMA) and High Speed Packet Access (HSPA) of UMTS.

Next, further exemplary embodiments of the control node will be explained. However, these embodiments also apply to the method, the terminal, the node, and the computer program.

In particular, the control node may be configured to, particularly automatically, execute one or more steps of the above described method.

In particular, the control node may be configured as a Mobility Management Entity (MME) or a Serving Gateway GPRS Support Node (SGSN).

Referring to FIG. 1, a method of determining a transition of a terminal between its idle state and its connected state according to a first exemplary embodiment of the invention will be explained. A communication architecture associated with the method comprises a cellular communication network 100 which comprises a core network 102 and a packet switched radio access network 104, for example a LTE radio access network. A control node 106, for example a MME, is located in the core network 102, and a node 108, for example an eNodeB, is part of the radio access network 104. The control node 106 is associated with the radio access network 104. A MTC terminal 110 is located in the coverage area of the node 108.

The method enables, on the one hand, the MTC terminal 110 to save energy resources and, on the other hand, the node 108 and the control node 106, to efficiently distribute and deploy network resources, particularly for highly mobile terminals, in the communication network 100. To this end, the node 108 supports a terminal independent or regular transition of a terminal between an idle state of the terminal and a connected state of the terminal, and a terminal specific transition of a terminal between an idle state of the terminal and a connected state of the terminal.

In a first step 112 of the method, at least one bearer configuration is predefined in the terminal 110 and the node 108 by pre-configuring the terminal 110 and the node 108 with the at least one bearer configuration. The preconfigured at least one bearer configuration is to be used for user plane communication between the terminal 110 and the node 108. Optionally, in this step 112, the bearer configuration may be also predefined in the control node 106. This predefinition takes place before taking the respective entities 106, 108, 110 into operation.

It is assumed that the terminal 110 initiates a terminal independent transition from its idle state into its connected state in which the terminal 110 will be connected to the node 108. In a step 114 of the method, the terminal 110 sends an initial attach related message, for example an Initial Attach Request message, to the control node 106 via the node 108. This message comprises information about a capability of the terminal 110 related to a security configuration, a preferred security configuration of the terminal 110, and/or a supported security configuration of the terminal 110. The capability of the terminal 110 related to the security configuration may be a support for a certain encryption algorithm. In a next step 116, the node 108 sends a message to the control node 106, which messages comprises information about a supported security configuration of the node 108. This message is not related to the Initial Attach procedure, and may be also sent prior to the Initial Attach Request message in the step 114. Alternatively, this message may be part of the Initial Attach procedure, and the messages received by the control node 106 in the steps 114, 116 may be the same in that the node 110 may include the information about the supported security configuration in the Initial Attach Request message received in the step 114, and may forward this message to the control node 106.

In a next step 118, the control 106 determines the security configuration to be used for communication between the terminal 110 and the node 108 based on the information received in the steps 114, 116. In a next step 120, the control node 106 informs the terminal 110 about the determined security configuration by sending an initial attach related message, for example an Initial Attach Response message. Information about the determined security configuration is included in this message together with information about the terminal type of the terminal 110. The latter information indicates that the terminal 110 is configured as a MTC device. To this end, the control node 106 has downloaded subscription information from a subscriber server, for example a HSS of the communication network 100, in which subscription data the information about the terminal type is included. The message is received by the node 108, and the information about the terminal type is extracted. Thereupon, in a step 122, the Initial Attach Response message is sent from the node 108 to the terminal 110. Alternatively, two separate messages may be sent to convey this information to the node 108 and the terminal 110. The Initial Attach Response message comprising the information about the determined security configuration is sent from the control node 106 to the terminal 110, and another downlink message comprising the information about the terminal type is sent from the control node 106 to the node 108. The downlink message is sent prior or subsequent to the Initial Attach Response message.

In a next step 124, the terminal 110 performs a terminal independent transition from its connected state into its idle state.

After some time, in a step 126, the terminal 110 initiates a connection setup procedure for setting up a connection between the terminal 110 and the node 108 by sending a connection setup related message to the node 108. This message comprises a request for a terminal specific transition to be performed for the terminal 110 and a request for an immediate transition of the terminal 110 into its idle state after an expiration of an inactivity time of the terminal 110 in its connected state. The inactivity time is predefined in the terminal 110 and corresponds to 1 minute. In a next step 128, the node 108 determines whether to perform the terminal specific transition for the terminal 110 based on the information about the terminal type received in the message 124. Since the information indicates the terminal type to correspond to a MTC terminal, the determination of the step 128 is in the affirmative, and in a next step 130, the node 108 selects the terminal specific transition to be performed for the terminal 110. Next, in a step 131, the node 108 determines whether to perform the immediate transition based on the request received in the step 126. To this end, the node 108 evaluates whether the terminal specific transition is performed for the terminal 110. Since the determination of the step 128 was in the affirmative, the determination of the step 131 is also in the affirmative. Thereupon, in a step 132, the node 108 sends, based on the determination result of the step 128 and/or the selection in the step 130, a connection setup related message to the terminal 110 in which granting information indicating the grant of the request for the terminal specific transition are included. In a step 134, the terminal 110 establishes a bearer associated with the pre-configured at least one bearer configuration, since no information about a determined bearer configuration has been received by the node 108 either from the control node 106 or the terminal 110. In a step 136, the terminal 110 sends a connection setup related message to the node 108.

For example, the connection setup related messages in the steps 126, 132 and 136 are configured as a RRCConnectionRequest message, a RRCConnectionSetup message and a RRCConnectionSetupComplete message, respectively.

In a next step 138, the node 108 sends a connection setup related message, for example a S1AP Initial UE message, to the control node 106. The control node 106 sends, in a step 142, a connection setup related message to the node 108. This message is configured as a S1AP Initial Context Setup Request message, and comprises information about the determined security information for informing the node 108 about the determined security configuration. In a simultaneously or subsequently performed step 144, the terminal 110 applies the security configuration for communication with the node 108. Next, in a step 146, the node 108 also applies the security configuration for communication with the terminal 110, and, particularly in absence of being informed about a bearer configuration to be used for communication between the node 108 and the terminal 110, establishes a bearer associated with the preconfigured at least one bearer configuration.

In a step 148, the node 108 informs the terminal 110 about a successful bearer establishment in a step 150 by sending a downlink resource grant for indicating a grant of resources in a downlink direction. The node 108 further assigns in a step 150 a priority to the established bearer to enable the terminal 110 performing the immediate transition to be served with higher priority compared to other terminals being connected to the node 108.

Upon reception of the downlink grant in the step 148, the terminal 110 terminates the terminal specific transition, and is then in its connected state in the step 152.

The node 108 constantly monitors the activity state of the terminal 110 by evaluating whether information exchange to and from the terminal 110 is present. It is assumed that after a traffic burst sent by the terminal 110 no further data are sent from or received by the terminal 110. The node 108 starts a timer of a length corresponding to the inactivity time after a time when the traffic burst was sent. After the expiration of the timer, the node 108 informs the control node 106 about the expiration of the timer. Thereupon, in a step 154, the control node instructs the node 108 to immediately release all established bearers of the terminal 110 which, in turn, performs this in a step 156.

If the determination of the step 128, 131 is not in the affirmative, the method will stop and the regular transition of the terminal 110 from its idle state into its connected will be performed for the terminal 110.

Further, in a case of an unsuccessful bearer establishment in the step 146, the node 108 will also inform the terminal 110 about the latter.

Further, the terminal 110 may also inform the node 108 about the determined security configuration by including respective information about the security configuration in the message sent in the step 136. In this case, the message sent in the message 142 may not comprise the information about the determined security configuration.

Figure 2:
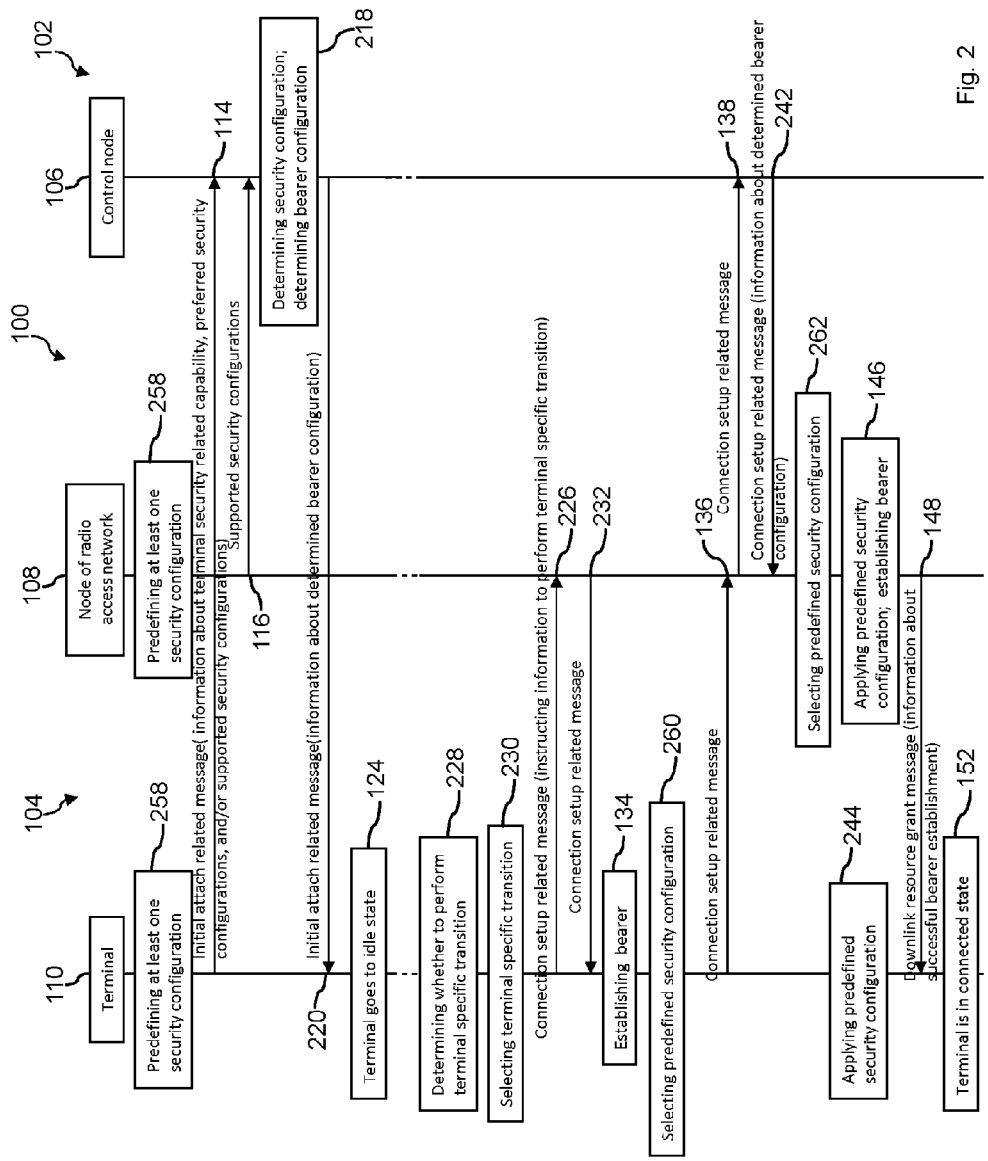

Referring to FIG. 2, a method of determining a transition of a terminal between its idle state and its connected state according to a second exemplary embodiment of the invention will be explained. The communication architecture associated with the method is identical to the communication architecture depicted in FIG. 1.

In a first step 258 of the method, at least one security configuration used for communication between the terminal 110 and the node 108 is predefined in the terminal 110 and the node 108 by preconfiguring both entities 110, 108 with the at least one security configuration. Thereupon, when the terminal 110 initiates a terminal independent transition from its idle state into its connected state, steps 114, 116 explained with reference to FIG. 1 are executed. In a step 218, the control node 106 determines a security configuration and a bearer configuration to be used between the terminal 110 and the node 108 for communication based on the received information. In a step 220, an initial attach related message, for example an Initial Attach Response message, is sent from the control node 108 to the terminal 110 comprising information about the determined security configuration and the determined bearer configuration. Thereupon, in a step 124, the terminal 110 performs a regular transition from its connected state into its idle state.

When being in its idle state, the terminal 110 determines in a step 228 whether to perform a terminal specific transition from its idle state into its connected state, as will be explained with reference to FIG. 7. Assuming the determination to be in the affirmative, the terminal 110 selects in a step 230 the terminal specific transition to be performed. In a next step 226, the terminal 110 instructs the node 108 to perform the terminal specific transition by sending a connection setup related message, for example a RRCConnectionRequest message, to the node 108 comprising respective instructing information. In a step 232, a connection setup related message, for example a RRCConnectionSetupRequest message, is sent from the node 108 to the terminal 110. In a step 134, the terminal 110 establishes a bearer based on the information about the determined bearer configuration received in the step 220. In a step 260, the terminal 110 selects the predefined at least one security configuration in absence of any information about a security configuration to be used. In a subsequent step 136, the terminal 110 sends a connection setup related message. Subsequent to a reception of a connection setup related message from the node 108 in a step 138, the control node 106 informs the node 108 in a step 242 about the determined bearer configuration by sending another connection setup related message, for example a S1AP Initial Context Setup Request message, comprising respective information. In a step 262, the node 108 selects the predefined at least one security configuration in absence of being informed by the control node 106 or the terminal 110 about the determined security configuration. In a step 244, the terminal 110 applies the predefined at least one security configuration for communication, and, in a step 146, the node 108 also applies the predefined at least one security configuration, and establishes a bearer associated with the determined bearer configuration. The node 108 then informs the terminal 110 in a step 148 about the successful bearer establishment in the step 146 by sending a downlink resource grant for indicating a grant of resources in a downlink direction. Thereupon, the method proceeds with a step 152 illustrated in FIG. 1.

The connection setup related message in the step 136 may comprise information about the selected security configuration and/or information about the determined bearer configuration for informing the node 108 about the selected security configuration and/or the determined bearer configuration. Further, in a case of an unsuccessful bearer establishment in the step 146, the node 108 will also inform the terminal 110 about the latter.

Figure 3:
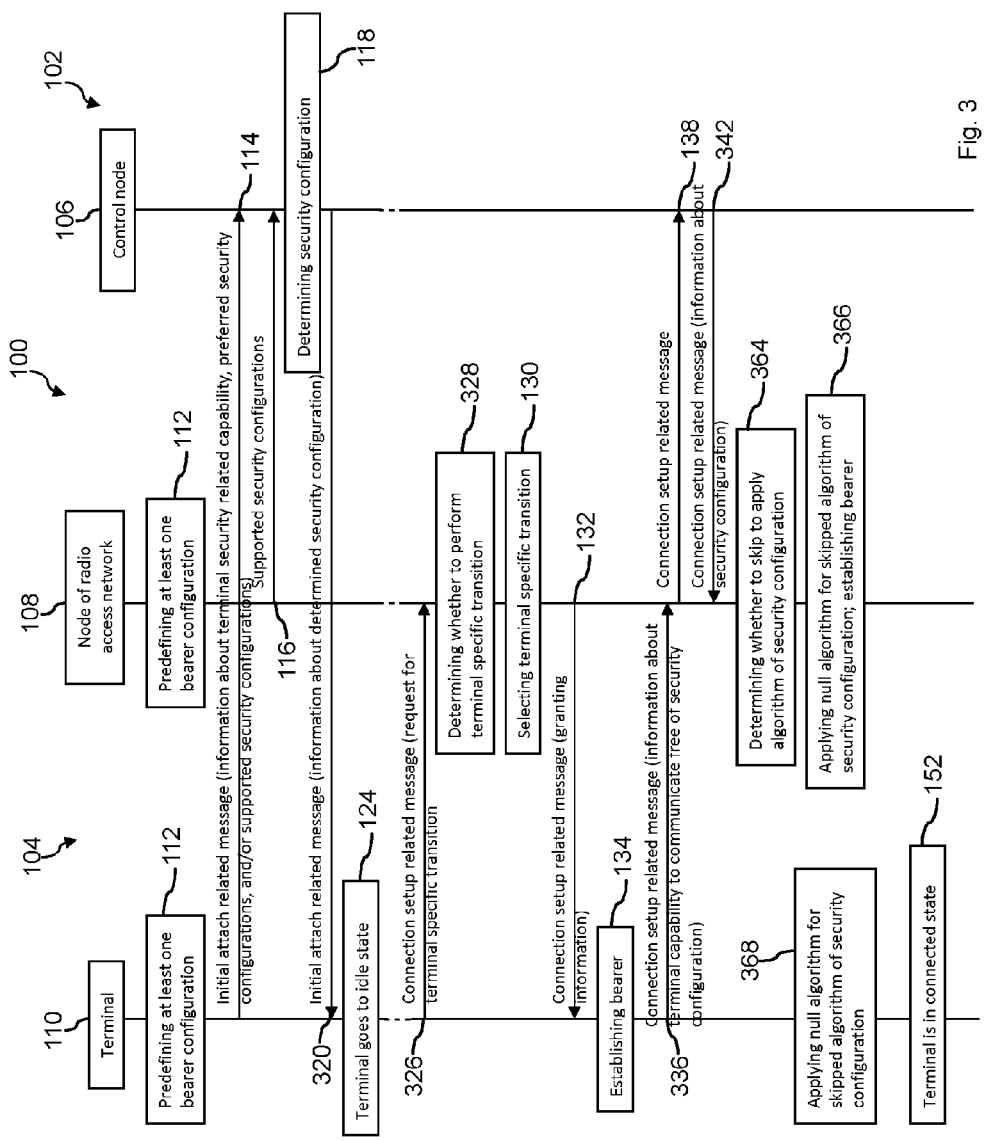

Referring to FIG. 3, a method for determining a transition of the terminal between its idle state and its connected state according to a third exemplary embodiment of the invention will be explained. A communication architecture associated with the method is identical to the communication architecture depicted in FIG. 1.

First, steps 112 to 118 illustrated in FIG. 1 are executed. Thereupon, the terminal 110 is informed by the control node 106 in a step 320 about the determined security configuration via an initial attach related message, for example, an Initial Attach Response message, sent between the control node 106 and the terminal 110. Thereupon, the terminal 110 performs a terminal independent transition into its idle state in a step 124.

Next, in the idle state of the terminal, the terminal 110 requests a terminal specific transition to be performed in a step 326 by sending a connection setup related message, for example a RRCConnectionSetupRequest message, comprising a respective request. Next, in a step 328 the node 108 determines whether to perform the terminal specific transition for the terminal based on velocity related information of the terminal 110. This step 328 is explained with reference to FIG. 9. Assuming the determination to be in the affirmative, the step 130, 132 illustrated in FIG. 1 is executed. The terminal 110 informs the node 108 in a step 336 about a capability of the terminal 110 to communicate free of a security configuration by sending a connection setup related message, for example a RRCConnectionSetupComplete message, including respective information. Subsequent to a step 138 illustrated in FIG. 2, the control node 108 informs the node 108 in a step 342 about the determined security configuration by sending a connection setup related message, for example a S1AP Initial Context Setup Request message, comprising respective information. In a step 364, the node 108 determines whether to skip applying an algorithm of the security configuration. Here, the node 108 evaluates the information about the terminal capability to communicate free of a security configuration received in the step 336 and accordingly determines to skip to apply the algorithm but to apply a null algorithm for the skipped algorithm. Next, in a step 366, the node 108 applies a null algorithm instead of the algorithm of the security configuration for the communication with the terminal 110. Further, the node 108 establishes a bearer associated with the at least one preconfigured bearer configuration in absence of being informed about a bearer configuration to be used for communication with the terminal 110. In a step 368, the terminal 110 also applies the null algorithm instead of the algorithm of the security configuration for communication with the node 108. Thereupon, a step 152 illustrated in FIG. 1 is executed.

If the determination in the step 128, 364 is not in the affirmative, the method will stop and procedures related to the regular transition of the terminal 110 from its idle state into its connected are applied by the communication network 100.

Further, the terminal 110 may initiate a data transmission to a terminating side, and may then verify whether the node 108 may has successfully established the bearer or not.

Figure 4:
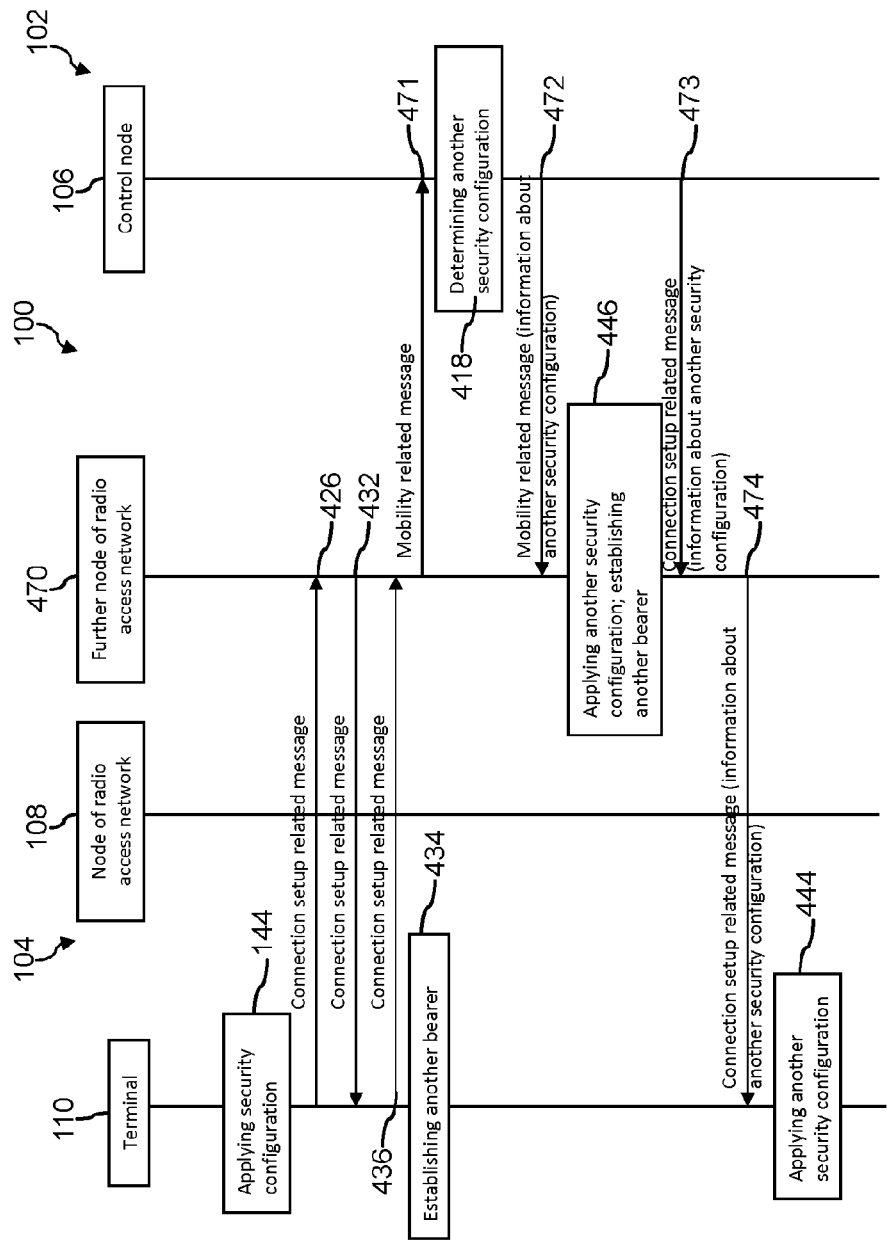
FIGS. 4, 5 are flow diagrams illustrating embodiments of a cell re-selection of the terminal during its transition from its idle state into its connected state associated with the method in FIG. 1.
Figure 5:
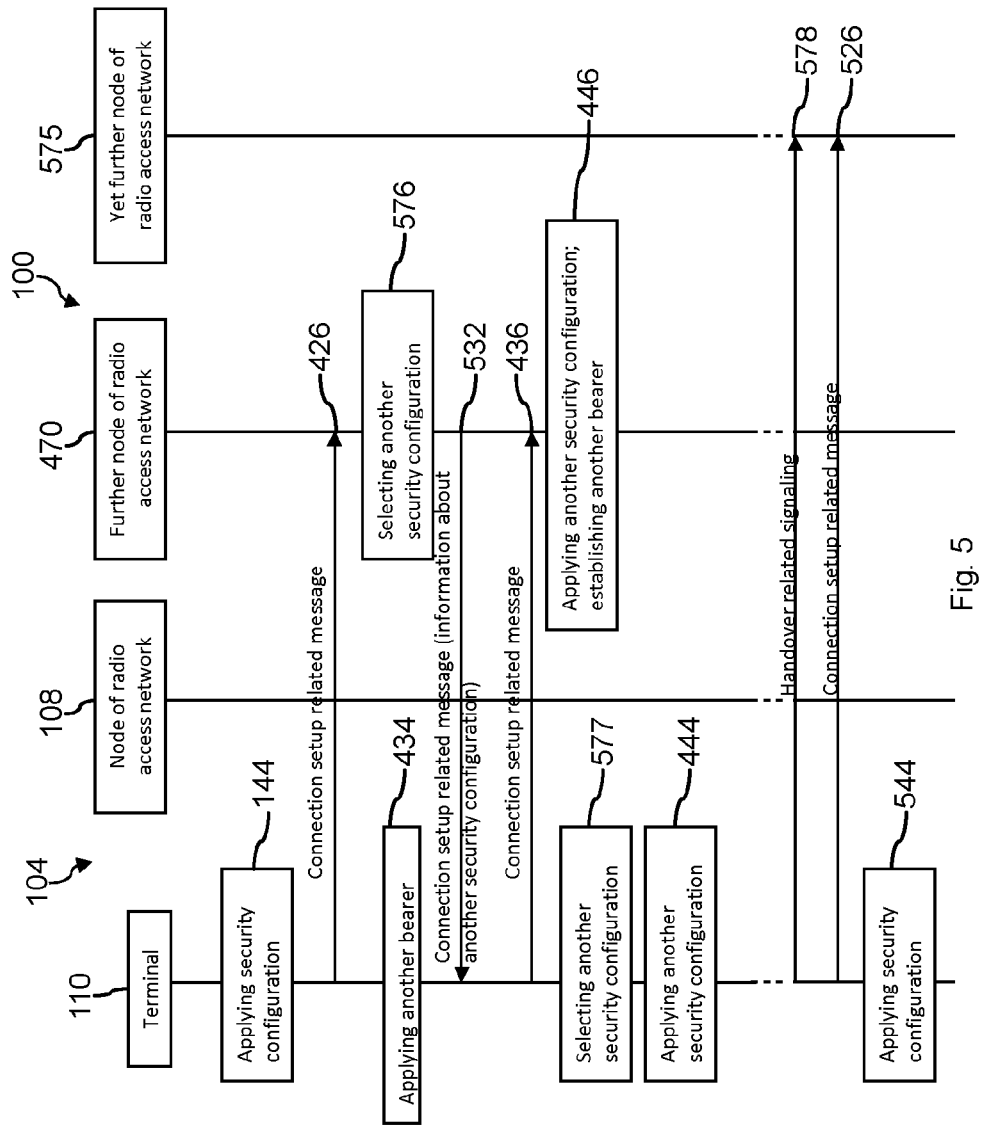

Referring to FIGS. 4 to 5, three embodiments of the methods relating to a cell re-selection of the terminal 110 during the terminal specific transition from its idle state into its connected state will be explained in more detail.

In the first embodiment, subsequent to the step 144 of FIG. 1 or 3, the terminal 110 enters a coverage area of a further node 470 of the radio access network 104, for example a further eNodeB, and performs a connection setup related procedure by accordingly exchanging with the further node 470 connection setup related messages in the steps 426, 432, 436. The messages of the steps 426, 432, 436 are configured as RRCConnectionRequest message, RRCConnectionSetup message and RRCConnectionSetupComplete message, respectively. In a step 471, a mobility related message, for example a S1AP Path Switch Request message, is sent between the further node 470 and the control node 106. In a step 418, the control node 106 determines another security configuration to be used between the terminal 110 and the further node 470 based on the information received in the steps 114, 116. In a step 472, the control node 106 informs the further node 470 about the another security configuration by sending another mobility related message, for example a S1AP Path Switch Request Acknowledgement message, to the further node 470 comprising information about the another security configuration. In a step 446, the further node 470 applies the security configuration based on the received information, and establishes a bearer associated with the at predefined least one bearer configuration in absence of being informed about the bearer configuration to be used. Simultaneously, the terminal 110 establishes a bearer associated with the predefined at least one bearer configuration in a step 434. In steps 473, 474, the control node 106 informs the terminal 110 about the determined another security configuration in that connection setup related messages, for example NAS Tracking Area Update messages or a new NAS messages, are sent between the control node 106 and the further node 470 and the further node 470 and the terminal 110, respectively. In these messages, information about the determined another security configuration is included. In a next step 444, the terminal 102 applies the another security configuration based on the received information.

A second embodiment is identical to the first embodiment detailed with reference to FIG. 4, however, the determined another security configuration is selected by the control node 106 from a set of security configurations supported by all control nodes 106 and all nodes 108, 470 in the communication network 100. Further, the determination in the step 418 is not executed based on the information received in the steps 114, 116.

In a third embodiment illustrated in FIG. 5, the radio access network 104 comprises a yet further node 575, an eNodeB. Steps 144 and 426 illustrated in FIG. 4 are executed. Thereupon, in a step 576, the further node 470 selects another security configuration to be used for communication between the terminal 110 and the further node 470, and accordingly informs the terminal 110 in a step 532 using a connection setup related message, for example a RRCConnectionSetup message. In the sent message information about the selected another security configuration is included. In a step 434, prior to the reception of the message sent in the step 532, the terminal 110 applies the predefined at least one bearer configuration, since the terminal 110 has not been informed by the control node 106 in the step 122 about the bearer configuration to be used for the communication with the further node 470. Next, steps 436 and 446 of FIG. 4 are executed. The step 446 is simultaneously executed to the step 562. Thereupon, the terminal 110 selects in a step 577 the another security configuration, and applies in a step 444 the another security configuration for communication.

The another security configuration may be dynamically selected by the further node 470, for example from a group of security configurations supported by the terminal 110. In a case in which at least one security configuration is predefined in the terminal 110 and the node 470, the selected another security configuration may be this at least one security configuration. This security configuration may be supported by all nodes 108, 470 in the radio access network 104.

After some time, the terminal 110 roams into the coverage area of the yet further node 575, either during the terminal specific transition or when being in its connected state. Subsequent to a handover related signaling exchange between the terminal 110 and the yet further node 575 in a step 578, the terminal 110 initiates a connection setup procedure with the yet further node 575 by sending, in a step 526, a connection setup related message, for example a RRCConnectionSetupRequest message, to the yet further node 575. Afterwards, the terminal 110 applies in a step 544 the security configuration determined by the control node 106, and assumes this security configuration to be valid until reception of information about another security configuration. It is noted that the yet further node 575 may be a node distinct from the nodes 108, 470 or may be identical to the node 108. The connection setup procedure between the yet further node 575 and the terminal 110 continues similarly as illustrated in the step 232 in FIG. 1.

Figure 6:
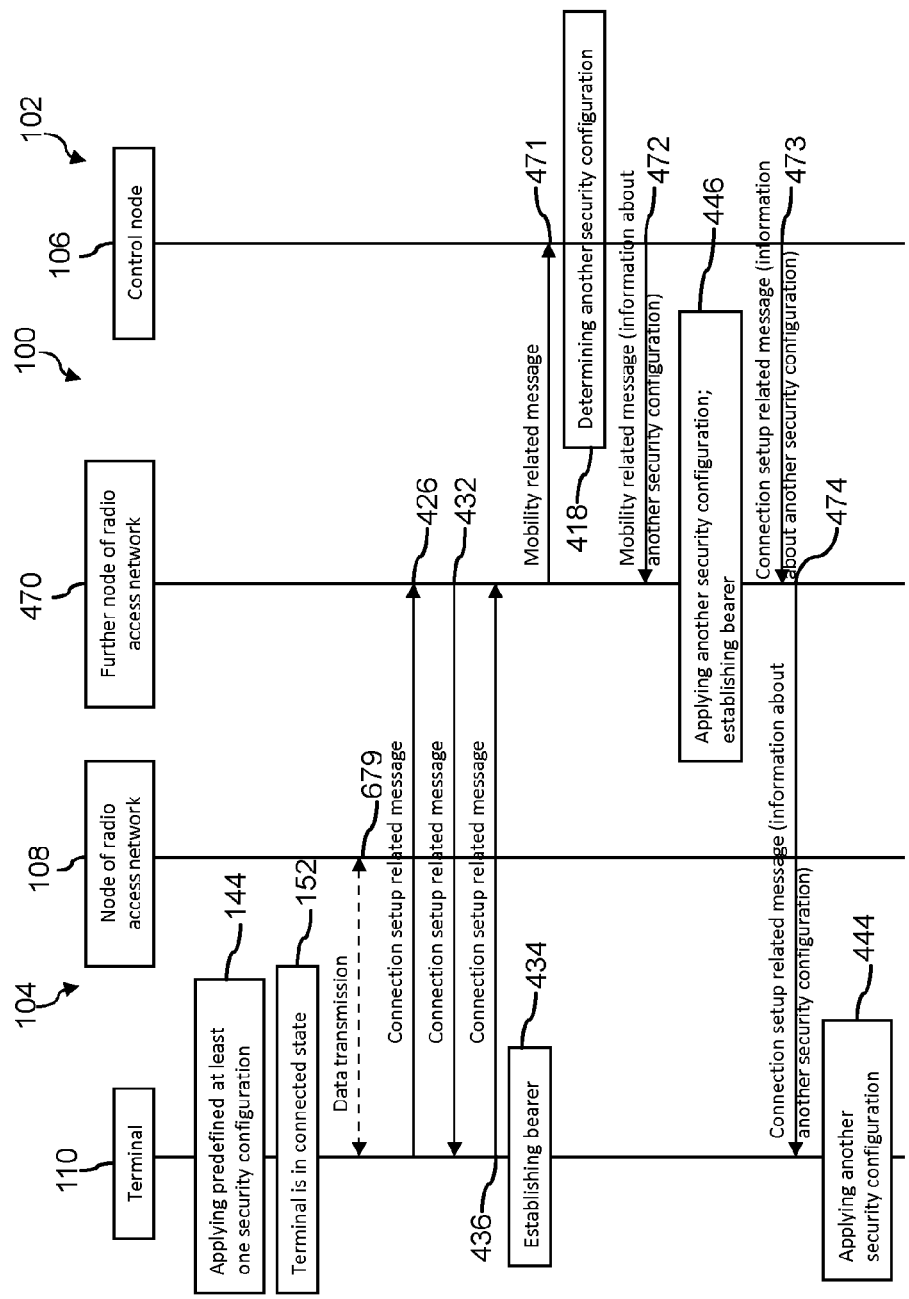
FIG. 6 is a flow diagram illustrating a handover of the terminal subsequent to its transition from its idle state into its connected state associated with the method in FIG. 1.

Referring to FIG. 6, a setup of a security configuration and a bearer configuration between the terminal 110 and the further node 470 in association with a handover of the terminal 110 from the node 108 to the further node 470 of the radio access network 104 will be explained. Subsequent to the steps 144, 152 of the method illustrated in FIG. 1, a data transmission between the terminal 110 and the node 108 is executed in a step 679. When entering the coverage area of the further node 470, the method proceeds with the step 426 illustrated in FIG. 4.

Referring to FIG. 7, the step 228 of FIG. 2 of determining, by the terminal 110, whether to perform the terminal specific transition will be explained in more detail. The method of FIG. 2 starts in a step 780. First, the terminal 110 enters its idle state in a step 124 or is in its idle state. Next, the terminal 110 performs a mobility state estimation 781 based on a determination of an actual velocity of the terminal 110 using mechanisms defined in TS 36.304v10.2.0 when receiving a page message or when data arrives at the transmission buffer of the terminal 110 from higher protocol layers. Thereupon, in a step 782, the terminal 110 determines whether to switch into its connected state. If the determination of the step 782 is in the affirmative, the terminal 110 determines in a step 784 whether the mobility state of the terminal 110 corresponds to medium or high. If this determination is in the affirmative, the terminal 110 selects, in a step 230, the terminal specific transition to be performed. Thereupon, the terminal 110 switches into its connected state and is in a step 152 in its connected state, and, in a step 788, the method stops.

If the determination of the step 782 is not in the affirmative, the method proceeds to the step 788. If the determination of the step 784 is not in the affirmative, the terminal 110 selects the regular transition to be performed in a step 786. Thereupon, the method proceeds to the step 152.

The determination step 228 comprises the steps 781, 782, 784.

Referring to FIG. 8, the step 328 in FIG. 3 of determining, by the node 108, whether to perform the terminal specific transition will be explained in more detail. In a first step 880, the method of FIG. 3 starts. Thereupon, the node 108 receives in the step 326 the connection setup related message comprising the request of the terminal 110 for the terminal specific transition. Next, in a step 890, the node 108 determines whether information about a terminal specific average velocity measured by directional measurements using an antenna setup and/or information about average terminal velocity derived from all terminals in the radio access network 104 are available in the node 108. If the determination is in the affirmative, i.e. if at least one type of the information is available, the node 108 determines in a next step 892 whether the estimated average terminal velocity is medium or high. If the determination is in the affirmative, the node 108 selects in a step 130 the terminal specific transition to be performed. Thereupon, when the terminal specific transition is terminated, the terminal 110 is in its connected state in a step 152, and, in a next step 888, the method stops.

If at least one of the determinations in the steps 890, 892 is not in the affirmative, the node 108 selects in a step 886 the regular transition to be performed for the terminal 110, and the method proceeds to the step 152.

The determination step 328 comprises the steps 890, 892.

Referring to FIG. 9, a terminal 910 for determining a transition of the terminal 910 between its idle state and its connected state is illustrated. The connected state of the terminal 910 is associated with the terminal 910 being connected to a node of a radio access network of a communication network. The terminal 910 comprises at least one of a setting up unit configured to at least partly set up, prior to a connection setup procedure for setting up a connection between the terminal 910 and the node, a security configuration to be used between the terminal 910 and the node for communication, and another setting up unit configured to at least partly set up, prior to the connection setup procedure, a bearer configuration to be used between the terminal 910 and the node for communication. Alternatively, the terminal 910 may comprise one setting up unit configured to at least partly set up both the security configuration and the bearer configuration.

Further, the terminal 910 comprises a reception unit RU1 configured to receive information related to a method for determining a transition of a terminal between its idle state and its connected state as described above, particularly with reference to FIGS. 1 to 8. The terminal 910 further comprises a sending unit TU1 configured to send information related to the method, a processing unit PU1 configured to process information related to the method, and a reception unit RU1 configured to store information related to the method.

Each of the setting up units of the terminal 910 is part of the sending unit TU1, the processing unit PU1 and the sending unit SU1 of the terminal 910.

The terminal 910 is configured to execute one or more steps of the above mentioned method, and comprises respective functionally defined units configured to execute the one or more steps of the method. In particular, the setting up units are configured to receive information about a determined or predefined security configuration and/or bearer configuration, respectively.

Referring to FIG. 10, a node 1008 of a radio access network for determining a transition of a terminal between its idle state and its connected state is described. The connected state of the terminal is associated with the terminal being connected to the node 1008 of the radio access network of a communication network. The node 1008 comprises at least one of a setting up unit configured to at least partly set up, prior to a connection setup procedure for setting up a connection between the terminal and the node 1008, a security configuration to be used between the terminal and the node 1008 for communication, and another setting up unit configured to at least partly set up, prior to the connection setup procedure, a bearer configuration to be used between the terminal and the node 1008 for communication. Alternatively, the node 1204 may comprise one setting up unit configured to at least partly set up both the security configuration and the bearer configuration.

Further, the node 1008 comprises a reception unit RU2 configured to receive information related to a method for determining a transition of a terminal between its idle state and its connected state as described above, particularly with reference to FIGS. 1 to 8. The node 1008 further comprises a sending unit TU2 configured to send information related to the method, a processing unit PU2 configured to process information related to the method, and a storage unit SU2 configured to store information related to the method.

Each of the setting up units of the nodes 1008 is part of the sending unit TU2, the processing unit PU2, and the reception unit RU2 of the node 1008.

The node 1008 is configured as an eNodeB of a LTE radio access network.

Further, the node 1008 is configured to execute one or more steps of the above mentioned method, and comprises respective functionally defined units configured to execute the one or more steps of the method. In particular, the setting up units are configured to receive information about a determined security configuration and bearer configuration, respectively, from a terminal and/or a control node of the communication network associated with the node. Further, the setting up units are configured, prior to the connection set up procedure, to predefine at least one security configuration and at least one bearer configuration, respectively.

It is noted that the further nodes 470, 575 illustrated in FIGS. 4 to 6 may be similarly embodied as the node 1008.

Referring to FIG. 11, a control node 1106 of a communication network associated with a radio access network for determining a transition of a terminal between its idle state and its connected state is described. The connected state of the terminal is associated with the terminal being connected to a node of the radio access network of the communication network. The control node 1106 comprises at least one of a setting up unit configured to at least partly set up, prior to a connection setup procedure for setting up a connection between the terminal and the node, a security configuration to be used between the terminal and the node for communication, and another setting up unit configured to at least partly set up, prior to the connection setup procedure, a bearer configuration to be used between the terminal and the node for communication. Alternatively, the control node 1106 may comprise one setting up unit configured to at least partly set up both the security configuration and the bearer configuration.

The control node 1106 also comprises a reception unit RU3 configured to receive information related to a method for determining a transition of a terminal between its idle state and its connected state as described above, particularly with reference to FIGS. 1 to 8. The control node 1106 further comprises a sending unit TU3 configured to send information related to the method, a processing unit PU3 configured to process information related to the method, and a storage unit SU3 configured to store information related to the method.

Each of the setting up units is part of the sending unit TU3, the processing unit PU3, and the reception unit RU3 of the control node 1106.

The control node 1106 is configured as an MME of a packet switched domain of a core network which is, for example, part of an IMS based communication network.

Further, the control node 1106 is configured to execute one or more steps of the above mentioned method, and comprises respective functionally defined units configured to execute the one or more steps of the method. In particular, the setting up units are configured to determine, during an initial procedure between the terminal and the control node, a security configuration and a bearer configuration, respectively, to be used for communication between the terminal and the node. The control node 1106 further comprises an informing unit configured to inform the terminal and/or the node about the determined security configuration and/or the determined bearer configuration.

It is noted that an association between the functionally defined units and the physically defined units may be different from the above described embodiment. For example, each of the setting up units is part of the processing unit PU1, the sending unit TU1, the reception unit RU1, and the storage unit SU1 of the terminal 910.

While the invention has been illustrated and described in detail in the drawings and foregoing description, such illustration and description are to be considered illustrative or exemplary and not restrictive; the invention is not limited to the disclosed embodiments, and in particular not to those embodiments in accordance with the cited 3GPP TSs. Other variations to the disclosed embodiments can be understood and effected by those skilled in the art in practicing the claimed invention, from a study of the drawings, the disclosure, and the appended claims. In the claims, the word "comprising" does not exclude other elements or steps, and the use of indefinite articles "a" or "an" does not exclude a plurality. The mere fact that certain measures are recited in mutually different dependent claims does not indicate that a combination of these measures cannot be used to advantage. Any reference signs in the claims should not be construed as limiting the scope.

The invention claimed is:

1. A method of determining a transition of a terminal between its idle state and its connected state, wherein the connected state of the terminal is associated with the terminal being connected to a node of a radio access network of a communication network, the method comprising at least one of: setting up, prior to a connection setup procedure for setting up a connection between the terminal and the node, at least one security configuration to be used between the terminal and the node for communication, wherein the at least one security configuration is received by the terminal from a control node of the communication network associated with the radio access network, and wherein said setting up the at least one security configuration comprises determining, by the control node, the at least one security configuration during an initial procedure between the terminal and the control node; and setting up, prior to the connection setup procedure, at least one bearer configuration to be used between the terminal and the node for communication, wherein the at least one bearer configuration is received by the terminal from the control node; wherein the transition of the terminal between its idle state and its connected state is configured as a terminal specific transition, wherein the configuring includes determining whether to perform the terminal specific transition and selecting to perform the terminal specific transition for the terminal based on a result of the step of determining, and wherein the node is informed about the determined at least one security configuration by the control node during a connection setup procedure for setting up a connection between the node and the control node and/or by the terminal during the connection setup procedure for setting up the connection between the terminal and the node.

2. The method of claim 1, wherein said setting up the at least one security configuration comprises determining, by the control node, the at least one security configuration during an initial procedure between the terminal and the control node, and wherein the method further comprises informing the terminal about the determined at least one security configuration.

3. The method of claim 2, wherein said setting up the at least one security configuration comprises receiving, by the control node, information about at least one of a capability of the terminal related to the at least one security configuration, a preferred security configuration of the terminal, a supported security configuration of the terminal, and a supported security configuration of the node, and wherein said determining the at least one security configuration is executed based on the received information.

4. The method of claim 1, wherein the step of setting up the at least one security configuration comprises:
predefining at least one security configuration in the communication network, wherein the predefined at least one security configuration is supported by the node and by further nodes of the radio access network, the method further comprising:
selecting, by the terminal and the node, the predefined at least one security configuration.

5. The method of claim 4, wherein the step of selecting, by the node, the predefined at least one security configuration comprises selecting the predefined at least one security configuration in response to being informed by the terminal about the selected predefined at least one security configuration during the connection setup procedure and/or in response to an absence of being informed by the control node about the security configuration to be used.

6. The method of claim 1, the method further comprising skipping, by the node, application of an algorithm of the at least one security configuration for communication, based on information about a the characteristic of the terminal.

7. The method of claim 1, wherein said setting up the at least one bearer configuration comprises determining, by the control node, the at least one bearer configuration during the initial procedure between the terminal and the control node, wherein the method further comprises informing, by the control node, the terminal about the determined bearer configuration.

8. The method of claim 7, wherein the node is informed about the determined at least one bearer configuration by the control node during the connection setup procedure for setting up the connection between the node and the control node and/or by the terminal during the connection setup procedure for setting up the connection between the terminal and the node.

9. The method of claim 1, wherein said setting up the at least one bearer configuration comprises predefining at least one bearer configuration in the communication network, wherein the predefined at least one bearer configuration is supported by the node and by further nodes of the radio access network, and wherein the method further comprises establishing, by the terminal and the node, a bearer associated with the predefined at least one bearer configuration.

10. The method of claim 1, wherein the node further supports a terminal independent transition of the terminal from its connected state into its idle state.

11. The method of claim 1, wherein said determining whether to perform the terminal specific transition is executed by the terminal based on an estimated value of an actual velocity of the terminal in the radio access network.

12. The method of claim 1, wherein said determining whether to perform the terminal specific transition is executed by the node based on at least one of an estimated value of an average velocity associated with the terminal in the radio access network and information about a type of the terminal.

13. A terminal for determining a transition of the terminal between its idle state and its connected state, wherein the connected state of the terminal is associated with the terminal being connected to a node of a radio access network of a communication network, the terminal comprising at least one of: a setting up circuit configured to at least partly set up, prior to a connection setup procedure for setting up a connection between the terminal and the node, a security configuration to be used between the terminal and the node for communication, wherein said setting up the security configuration comprises determining, by a control node, the security configuration during an initial procedure between the terminal and the control node; and another setting up circuit configured to at least partly set up, prior to the connection setup procedure, a bearer configuration to be used between the terminal and the node for communication, wherein the transition of the terminal between its idle state and its connected state is configured as a terminal specific transition, wherein the configuring includes determining whether to perform the terminal specific transition and selecting to perform the terminal specific transition for the terminal based on a result of the step of determining, and wherein the node is informed about the determined at least one security configuration by the control node during a connection setup procedure for setting up a connection between the node and the control node and/or by the terminal during the connection setup procedure for setting up the connection between the terminal and the node.

14. A node of a radio access network for determining a transition of a terminal between its idle state and its connected state, wherein the connected state of the terminal is associated with the terminal being connected to the node of the radio access network of a communication network, the node comprising at least one of: a setting up circuit configured to at least partly set up, prior to a connection setup procedure for setting up a connection between the terminal and the node, a security configuration to be used between the terminal and the node for communication, wherein said setting up the security configuration comprises determining, by a control node, the security configuration during an initial procedure between the terminal and the control node; and another setting up circuit configured to at least partly set up, prior to the connection setup procedure, a bearer configuration to be used between the terminal and the node for communication, wherein the transition of the terminal between its idle state and its connected state is configured as a terminal specific transition, wherein the configuring includes determining whether to perform the terminal specific transition and selecting to perform the terminal specific transition for the terminal based on a result of the step of determining, and wherein the node is informed about the determined at least one security configuration by the control node during a connection setup procedure for setting up a connection between the node and the control node and/or by the terminal during the connection setup procedure for setting up the connection between the terminal and the node.

15. A non-transitory computer-readable medium comprising, stored thereupon, a computer program configured so that, when executed by a processor of a terminal, it causes the terminal to determine a transition of the terminal between its idle state and its connected state of by performing at least one of the following: at least partly setting up, prior to a connection setup procedure for setting up a connection between the terminal and the node, a security configuration to be used between the terminal and the node for communication, wherein said setting up the security configuration comprises determining, by a control node, the security configuration during an initial procedure between the terminal and the control node; and at least partly setting up, prior to the connection setup procedure, a bearer configuration to be used between the terminal and the node for communication, wherein the transition of the terminal between its idle state and its connected state is configured as a terminal specific transition, wherein the configuring includes determining whether to perform the terminal specific transition and selecting to perform the terminal specific transition for the terminal based on a result of the step of determining, and wherein the node is informed about the determined at least one security configuration by the control node during a connection setup procedure for setting up a connection between the node and the control node and/or by the terminal during the connection setup procedure for setting up the connection between the terminal and the node.

* * * * *